United States Patent [19]

Fields

[11] 3,889,712
[45] June 17, 1975

[54] VALVES
[76] Inventor: Robert E. Fields, 2-10 Regent St., Cambridge, England, CB2 1DB
[22] Filed: Nov. 27, 1973
[21] Appl. No.: 419,300

[30] Foreign Application Priority Data
Dec. 1, 1972 United Kingdom............ 55569/72

[52] U.S. Cl.............................. 137/625.47; 251/309
[51] Int. Cl............................................. F16k 11/02
[58] Field of Search.................. 137/625.41, 625.47; 251/309–312

[56] References Cited
UNITED STATES PATENTS
2,854,027   9/1958   Kaiser et al................ 137/625.47 X
3,012,752   12/1961  Buck.................................. 251/309
3,185,179   5/1965   Harautuneian ............... 137/625.47
3,314,644   4/1967   Dwyer et al. ........................ 251/309
3,475,002   10/1969  Phillips........................... 251/311 X
3,512,944   5/1970   Craig et al. .................. 251/311 UX
3,664,372   5/1972   Marshall ........................ 251/312 X
3,788,599   1/1974   Cloyd............................. 251/309 X Primary Examiner—Henry T. Klinksiek
Attorney, Agent, or Firm—Allison C. Collard

[57] ABSTRACT

Valve comprising a body of synthetic plastics material having one or more connection bores in a first plane. A further bore is located in the body in a transverse plane which extends from one wall of the body and intersects each connection bore. A rigid key is formed with at least one transverse bore for alignment with a connection bore in the body. The key is a compression fit in the transverse bore in the body.

7 Claims, 7 Drawing Figures

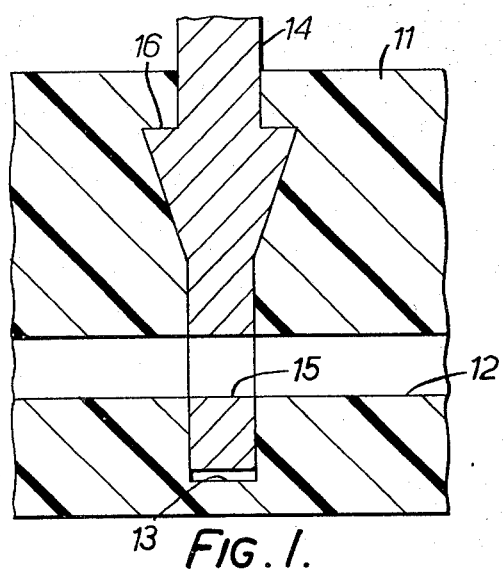
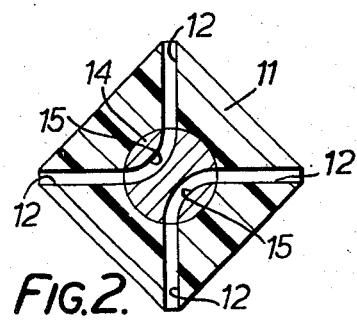
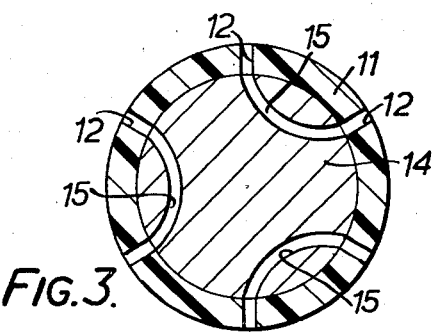
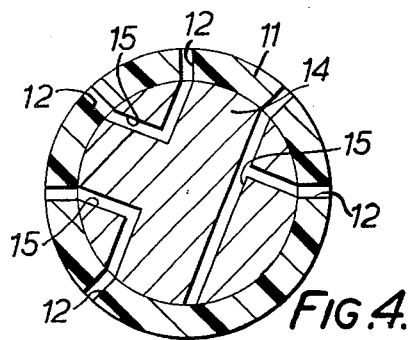
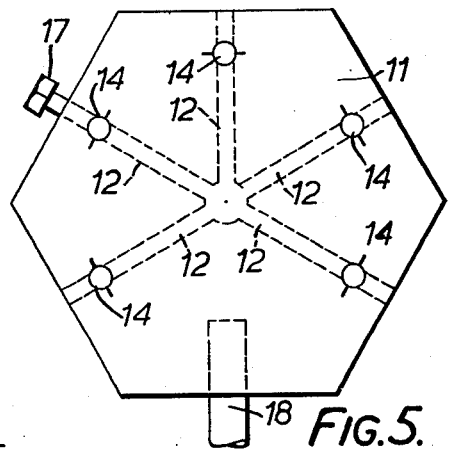
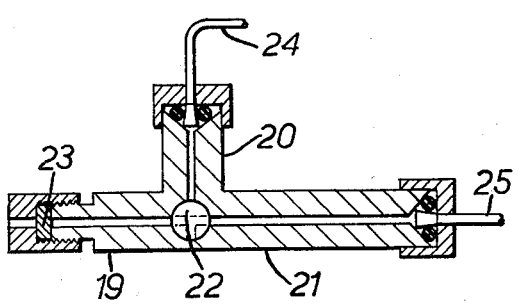
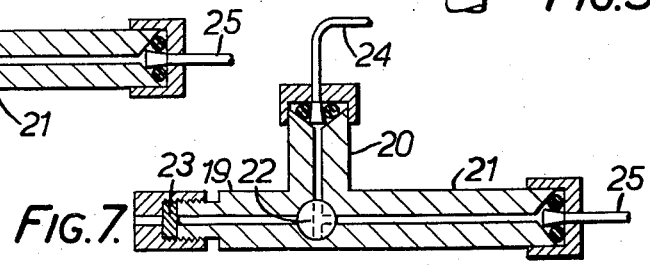

VALVES

The invention relates to valves and more particularly, although not exclusively, to valves suitable for use with laboratory equipment.

According to one aspect of the invention a valve comprises a body which is fabricated of a synthetic plastics material, e.g. polytetrafluoroethylene, having at least one connection bore in a first plane and a further bore in a transverse plane which extends from at least one wall of the body and intersects the or each connection bore, and a key which is fabricated of a rigid material, e.g. glass or metal, and is formed with at least one transverse bore for alignment with at least one connection bore in the body, the key being a compression fit in said transverse bore in the body.

The key may be retained in the transverse bore in the body by a wedge ring section formed thereon and such section may be formed with a knife edge.

The body may comprise a plurality of connection bores arranged radially to interconnect at a central point, each connection bore having a separate key operatively associated therewith.

Alternatively the body may comprise a plurality of connection bores arranged radially with a single key arranged at the interconnection point of said connection bores. In this form the key may be formed with a plurality of transverse bores for providing different interconnections of said connection bores for different rotational positions of the key.

The body may include three arms, each having a connection bore meeting at a common point in the body and the key is provided at said common point and has a T-section bore for selectively interconnecting the bore in one of the said arms to one or other of the remaining bores.

According to a further aspect of the invention there is provided a method of manufacturing a valve as hereinbefore defined wherein the key is heated prior to or after insertion into the transverse bore in the body. The body may be formed of polytetrafluoroethylene and the key be formed of metal, e.g. stainless steel, and heated to approximately 350°C. The bores in the body may be evacuated prior to the insertion of the key into the transverse bore.

The foregoing and further features of the invention may be more readily understood from the following description of some preferred embodiments thereof, by way of example, with reference to the accompanying drawing, in which:

FIG. 1 is a side sectional view of a part of a valve;

FIGS. 2, 3, 4 and 5 are schematic section or plan views of valves incorporating various switching interconnections, and, FIGS. 6 and 7 are side sectional views of a valve provided in a device for introducing samples into an apparatus.

Referring now firstly to FIG. 1 there is shown a portion of a valve which comprises a body 11 formed of polytetrafluoroethylene. The body 11 is formed with a connection bore 12, which may be a through bore, and a transverse bore 13, which intersects bore 12 but does not pass completely through body 11. A metal key 14 is located in bore 13 and is formed with a through bore 15 which is aligned with bore 12. The key 14 is formed with a wedge ring 16 having a knife edge so that such ring 16 acts in the form of a barb and retains the key 14 in position in bore 13.

In manufacture of the valve the body 11 is preformed with bore 12 and bore 13, the latter bore being of a diameter less than the diameter of key 14. Key 14 is heated to a temperature of about 350°C prior to being inserted in bore 13. Preferably the bores 12 and 13 are evacuated prior to the key 14 being inserted in bore 13 so that there is not pressure build up in the closed end of bore 13. When the key 14 is inserted in bore 13 and then rotated the knife edge of ring 16 cuts the material of body 11 and the fact that the key 14 is heated, heats the material of body 11 which fills in behind ring 16, so retaining key 14 in position.

The valve operates in normal manner with bore 12 opened or closed by alignment or non-alignment of bore 15 by rotation of key 14.

Referring now to FIG. 2 there is shown a vlve in which body 11 is formed with four bores 12 which meet at a key 14 formed with two bores 15. This valve is such that rotation of key 14 allows alternative adjacent bores 12 to be interconnected. FIG. 3 shows a similar arrangement but having six bores 12 and three bores 15. FIG. 4 shows a similar tap to FIG. 3 except that the placing of the bores have been rearranged such that the bores 15 in key 14 are straight rather than arcuate to facilitate manufacture.

FIG. 5 shows an alternative arrangement in which body 11 is formed with five bores 12 which meet at the centre of body 11. Each bore 12 is controlled by a separate key 14 so that any required interconnection combination of bores 12 can be achieved. Each bore 12 terminates at a connector 17 (one only shown) at which a tube or conduit can be attached. The connector 17 may advantageously be of the type disclosed in my copending United Kingdom Pat. application No. 19608/72. A support member 18 is also attached to body 11 whereby the body 11 can be clampled or otherwise attached to labroatory equipment.

Referring now to FIGS. 6 and 7 there is shown a device for introducing samples into a test apparatus. The device has three arms 19, 20 and 21 each having a bore meeting at a common point at which is located a key 22. The key 22 has a T-section bore so that either the bores in arms 19 and 21 are interconnected (FIG. 6) or the bores in arms 20 and 21 are interconnected (FIG. 7) by rotation of key 22. Arm 19 has a rubber septum 23 attached over its bore, arm 20 has its bore connected to a tube 24 for connection to a liquid supply source (not shown) and arm 21 has its bore connected via a tube 25 to a test apparatus (not shown). In use with key 22 in the FIG. 6 position a sample is injected into the bore of arm 21 by a syringe which is passed through septum 23 and through the bore in arm 19. The key 22 is then rotated to the FIG. 7 position and liquid from tube 24 passes into the device and moves the sample from the bore in arm 21 to the test apparatus.

The valves may also be provided as a part of a connector for interconnecting two tubes or as part of a buklhead connector for connecting a tube to an apparatus, such as a chromatography column.

I claim:

1. A valve comprising:
   a body constructed of a synthetic plastic material having at least one connection bore in a first plane and a further bore in a transverse plane which extends from at least one wall of the body and intersects each connection bore; and a key fabricated of a material harder than the body and formed with at least one transverse bore for alignment with one connection bore in the body, said key including a wedged ring section formed thereon and having a knife edge on the ring section, said key being a compression fit in said transverse bore in the body so that the knife edge of said wedge ring section engages the plastic material of said body portion.

2. A valve as claimed in claim 1 wherein the body comprises polytetrafluoroethylene.

3. A valve as claimed in claim 1 wherein the key comprises metal.

4. A valve as claimed in claim 1 wherein the body comprises a plurality of connection bores arranged radially to interconnect at a central point, each connection bore having a separate key operatively associated therewith.

5. A valve as claimed in claim 1 wherein the body comprises a plurality of connection bores arranged radially with a single key arranged at the interconnection point of said connection bores.

6. A valve as claimed in claim 5 wherein the key is formed with a plurality of transverse bores for providing different interconnections of said connection bores for different rotational positions of the key.

7. A valve as claimed in claim 6 wherein the body includes three arms, each having a connection bore meeting at a common point in the body and the key is provided at said common point and has a T-section bore for selectively interconnecting the bore in one of said arms with one or other of the remaining bores.

* * * * *